United States Patent [19]

Kelley

[11] Patent Number: 5,555,742
[45] Date of Patent: *Sep. 17, 1996

[54] EVAPORATIVE COOLER WITH SCRUBBER AND ENTHALPIC HEATING SYSTEM

[76] Inventor: Franklyn F. Kelley, 7802 N. 36th Dr., Phoenix, Ariz. 85021

[*] Notice: The term of this patent shall not extend beyond the expiration date of Pat. No. 5,361,600.

[21] Appl. No.: 336,303

[22] Filed: Nov. 8, 1994

Related U.S. Application Data

[63] Continuation of Ser. No. 89,940, Jul. 12, 1993, Pat. No. 5,361,600.

[51] Int. Cl.⁶ .................................................. F28D 5/00
[52] U.S. Cl. ......................... 62/311; 62/314; 62/235.1
[58] Field of Search ........................ 62/304, 310, 311, 62/314, 235.1, 259.4; 55/228

[56] References Cited

U.S. PATENT DOCUMENTS

| | | | |
|---|---|---|---|
| 1,078,608 | 11/1913 | Carrier | 62/310 |
| 1,093,869 | 4/1914 | Leinert | 62/310 |
| 4,658,600 | 4/1987 | Kelley | 62/311 |
| 4,815,297 | 3/1989 | Kelley | 62/91 |
| 5,003,789 | 4/1991 | Gaona et al. | 62/304 |
| 5,361,600 | 11/1994 | Kelley | 62/310 |

*Primary Examiner*—Henry A. Bennett
*Assistant Examiner*—William C. Doerrler
*Attorney, Agent, or Firm*—Gregory J. Nelson

[57] ABSTRACT

An evaporative air conditioning device which in the cooling section subjects the air to be treated to evaporative cooling. Prior to evaporative treatment, the air is subjected to treatment in a scrubber with spray nozzles emitting a mist or spray directed to the incoming air over substantially the entire cross-sectional area of the duct. The spray removes dust, pollutants, particulates and pollen from the air and also serves to wet the surface of the evaporative media. The air entering the scrubber section is enthalpically heated to expand the air utilizing radiant solar energy which lowers the water content per unit of volume and also lowers the wet bulb temperature. In an preferred embodiment, heat absorbent material is placed adjacent the inlet duct to the scrubber. The water which is directed to the evaporative section and also to the spray nozzles and the scrubber section may also be heated by solar heating means.

9 Claims, 2 Drawing Sheets

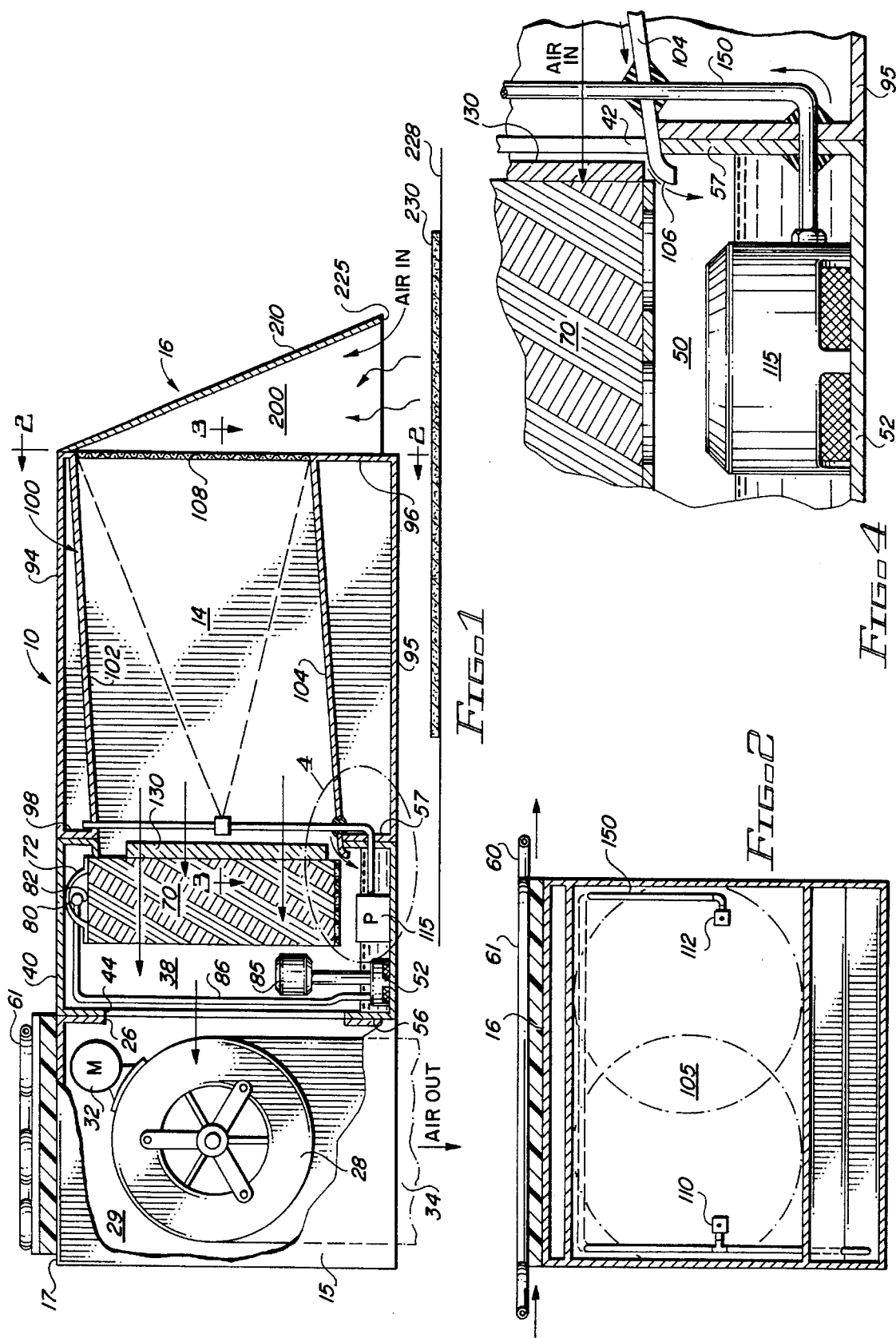

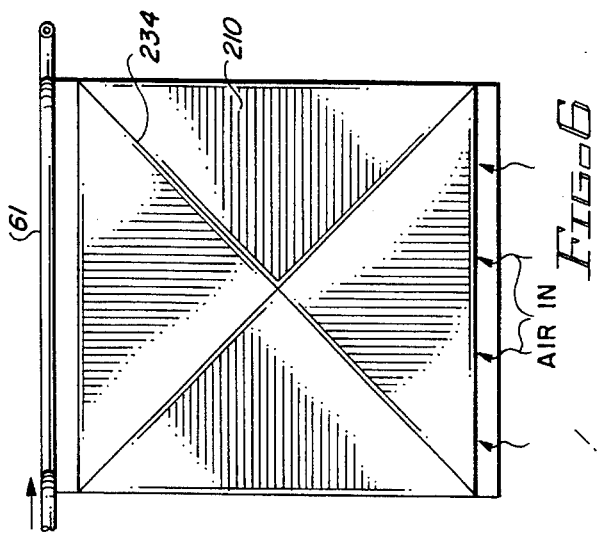
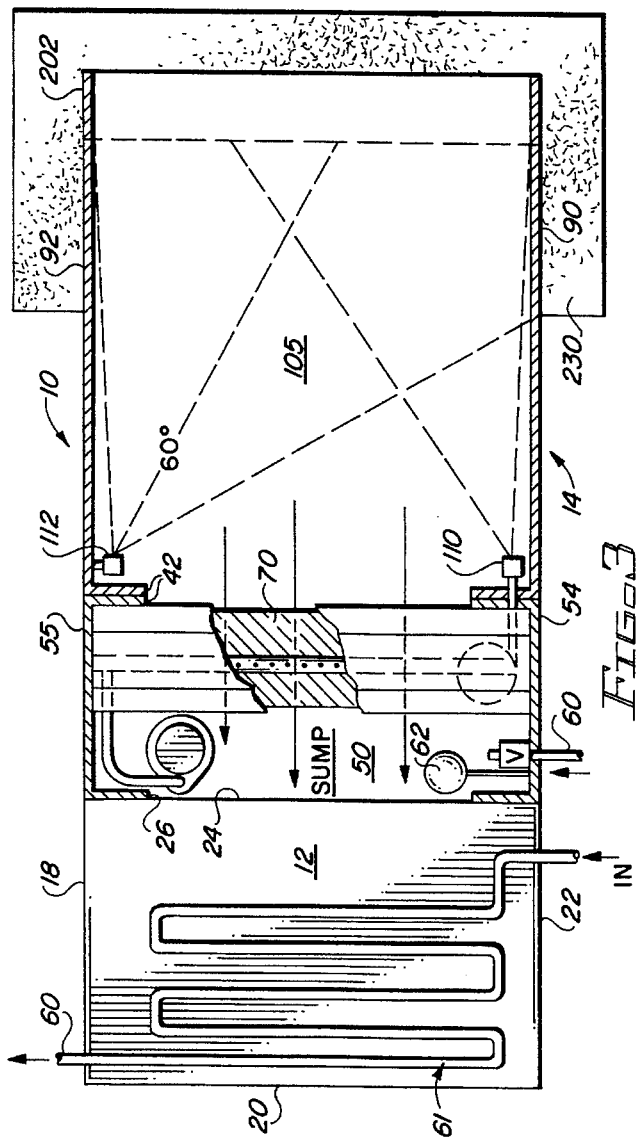
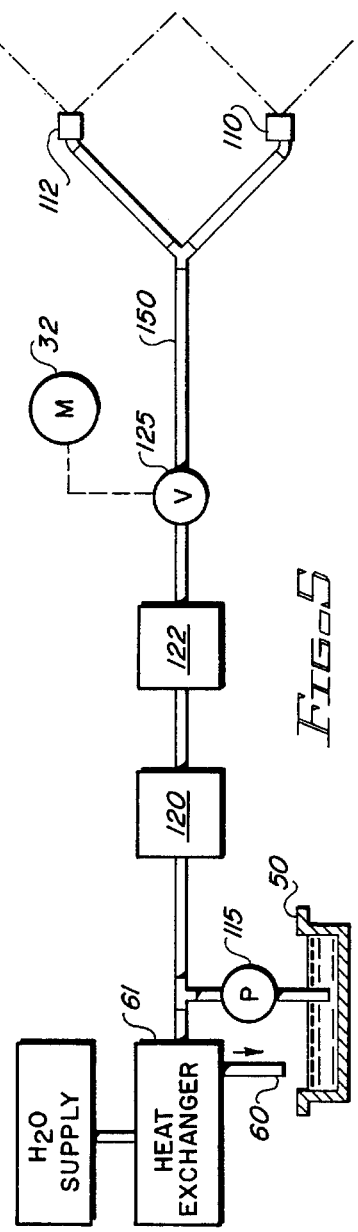

EVAPORATIVE COOLER WITH SCRUBBER AND ENTHALPIC HEATING SYSTEM

BACKGROUND OF THE INVENTION

Field of the Invention

This application is a continuation of co-pending application Ser. No. 08/089,940, filed on Jul. 12, 1993, now U.S. Pat. No. 5,361,600.

The present invention relates to air conditioning devices and more particularly to evaporative air conditioning devices having a scrubber section for the incoming air which incoming air has been enthalpically heated.

Cooling air by evaporative cooling has been utilized for many years, particularly in relatively dry climates. Conventional evaporative cooling devices generally include a housing of various shapes in which an air moving device such as a motor driven centrifugal blower is mounted which induces a flow of ambient air to be cooled through water-wetted pads. As the relatively dry, air passes through the wetted pads, the air is cooled by the well-known evaporative effect and the air moving device delivers the cooled air to a discharge location which is connected to an appropriate air distribution or duct system communicating with the area in which the temperature is controlled. Water for cooling is supplied from a sump within the cooler and the water level within the sump is maintained by a float valve. The water is pumped from the sump to the wettable pad and is distributed across the top of the pads and flows downwardly through the pads under the influence of gravity.

Evaporative coolers of the general type described above have found wide acceptance because of their low initial cost, low operational cost and their effectiveness at least during hot dry periods of relatively low humidity. However, there are certain disadvantages associated with the use, operation and maintenance of evaporative coolers.

During periods of use, substantial quantities of pollutants can be introduced into temperature controlled areas through the evaporative cooler. For example, noxious gases such as automobile emissions, as well as particulates, dust and pollen are present in the air. Some reduction of these pollutants may occur across the wettable pad. Nevertheless, substantial quantities remain in the air and are introduced into the temperature controlled area. This is particularly true in urban areas where chemical pollutants and automobile emissions may reach high concentrations. In addition, airborne dust, dirt and pollen, can reach very high levels, particularly when aggravated by wind or storms which often occur during hot, dry periods when evaporative coolers are used.

Another problem with evaporative coolers is their general ineffectiveness during periods of higher humidity. As mentioned above, evaporative devices draw ambient air through the cooler pads and rely on the evaporative effect for cooling. The result is that air is cooled towards the wet bulb temperature which is, in most instances, lower than the ambient temperature. Design standards rate conventional evaporative cooling machines as being approximately 60% to 80% efficient in reaching saturation temperature where maximum cooling is achieved. This means that when the wet bulb for a given day is 80° F., the ambient air temperature will be lower to within 60% to 80% of the wet bulb and the resulting cooling will be above 80° F. This saturation efficiency for evaporative cooling machines renders such machines ineffective during conditions of hot, wet air. For example, in the desert Southwest there are periods when air conditions are at 100° F. dry bulb and 80° F. wet bulb. At 80% saturation efficiency, air treated using the evaporative effect would be cooled only to 86° F. This temperature is in excess of the comfort zone which is generally considered to be in the range of 72° F. to 76° F.

Accordingly, evaporative coolers are not effective during certain conditions in certain geographical areas and users either have to endure degraded cooling or use more expensive cooling devices such as conventional vapor compression air conditioning systems.

Accordingly, there exists a need for an improved evaporative cooler which substantially reduces the problem of airborne pollutants and contaminants being carried into a temperature controlled area and which device has improved operational effectiveness and which can be used for cooling, even in periods of relatively hot, moist air.

My prior patent, U.S. Pat. No. 4,658,600, issued Apr. 21, 1987, discloses an evaporative air conditioning device which, in the cooling phase, subjects the air to be treated to evaporative treatment. Prior to evaporative treatment and introduction into the cooler, the incoming air is treated enthalpically to expand the air utilizing radiant solar energy to lower the water content per unit of volume and also to lower the wet bulb temperature. In the preferred embodiment, a heat absorbent material is placed adjacent the inlet ducts to the unit.

The present invention represents an improvement over the prior 4,658,600 patent as well as my prior Pat. No. 5,361,600. The improvement consists of utilizing enthalpic heating in conjunction with an evaporative cooler having a scrubber system which has the advantage of reducing contaminants and also markedly improving the overall efficiency of the cooler.

Briefly, in accordance with the present invention, an improved air conditioning device is disclosed which includes a motor-driven air handling device having a discharge connected to the area to be cooled. Air is cooled by evaporation in either conventional pads or pads of the type sold under the designation "Celdek" pads. Water is distributed across the pads and air is cooled as it passes through the pads. The air entering the cooler is preconditioned in a scrubber to eliminate or substantially reduce noxious fumes and particulate contaminants. The scrubber section is mounted adjacent the inlet to the evaporative cooler upstream of the evaporative media pad. The scrubber section has a sloped floor which extends to a sump which may be the sump of the evaporative cooler or may be a separate sump. Two or more airless spray mist nozzles are located within the scrubber and emit a high velocity spray or fine mist in a direction counter-current to the incoming air flow. The sprays are oriented to encompass or cover substantially the entire cross-sectional area of the scrubber so that the incoming air volume is entirely scrubbed. Gases and particulates in solution are removed by the water and the particulates flow into the sump. Water mist from the sprays which may be entrained in the air flow will migrate to the evaporative media which serves as a collector for the mist preventing the water mist from being carried into the cooler and the area being cooled. The introduction of water mist ahead of the evaporative media will also serve to prevent build-up of mineral deposits on the face of the pad. The apparatus also includes a filter immediately adjacent the evaporative pad that collects any residual moisture, dirt, minerals, dust or other solids and prevents them from entering the cooler and the temperature controlled area. The water supply to the spray nozzles in the scrubber is initially subjected to treatment including filtration to remove solids which could plug or damage the spray nozzles. The orientation, pressure and flow rate of the nozzles are carefully regulated to maintain the scrubbing effect without excessive water consumption or a discharge rate greater than the capacity of the evaporative unit.

Improved cooling efficiency is obtained by expanding the ambient air prior to its entry into the scrubber unit by utilizing heat provided by radiant solar energy. In the preferred embodiment, a heat absorbent material is placed adjacent the scrubber intake to heat the incoming air above the ambient free air temperature. When the air is heated it expands thereby lowering the water content per unit of volume which results in a lower humidity level and, accordingly, drier air. The expanded, drier air has a lower wet bulb temperature which results in a lower temperature of cooled air being discharged from the unit than would be possible by drawing in untreated air.

The term "enthalpic heating" is used as applied to heating the air by radiant energy since it utilizes solar heating passive solar energy introduced from outside the system of the invention.

In the preferred embodiment, the heat absorbent material may be a metal having an absorptive coating or may be a material such as black roofing material or black vinyl film.

Accordingly, it is a broad object of the present invention to provide an improved apparatus for cooling air utilizing the principle of evaporative cooling having a scrubber pretreatment section in which the air introduced into the scrubber section has been initially enthalpically heated.

The foregoing and other objects and advantages of the present invention as well as the invention itself will be more fully understood from the following description when read in conjunction with the accompanying drawings:

FIG. 1 is a longitudinal sectional view of a cooler, scrubber and heating unit in accordance with the present invention;

FIG. 2 is a sectional view taken along line 2—2 of FIG. 1;

FIG. 3 is a sectional view taken along line 3—3 of FIG. 1;

FIG. 4 is an enlarged detail view of a portion of the sump as indicated in FIG. 1;

FIG. 5 is a schematic representation of the water distribution system; and

FIG. 6 is a view of the inlet end of the unit.

Turning to the drawings in which the improved evaporative cooler system of the present invention is generally designated by the numeral 10, the cooler includes evaporative section 12, scrubber section 14, and heating section 16. The evaporative cooler section may be any conventional type of evaporative cooler such as an Adobe Air Master Cool, Phoenix Manufacturing Arrow Cool, Champion Ultracool unit or any unit of similar design.

The evaporative cooler has a cabinet 15 which is shown as being generally rectangular having a top wall 17, and upstanding side walls 18, 20, 22 and 24. A single inlet 26 is provided in side wall 24 to admit air into the air mover chamber 29. The air mover is housed in chamber 29 and includes a centrifugal blower 28 journaled for rotation within a housing and driven by electric motor 32 through a suitable or conventional pulley arrangement. Rotation of the blower wheel creates a negative static pressure within the chamber 29 which induces a flow of ambient air from the inlet 24 through the unit. For the purpose of illustration, the unit is shown as a downdraft unit discharging cooled air at outlet 34 into a duct system which distributes the air to a temperature controlled space or area to be cooled. The blower may be a single or multiple speed unit.

The evaporative cooler includes an evaporative section is interposed in the air flow path ahead of the air mover. The evaporator section is contained in a generally rectangular housing 40 having an exterior configuration generally conforming to that of cabinet 15. Inlet 42 and outlet 44 are provided at opposite sides of the evaporative section. Outlet 44 communicates with and is coincident with inlet 26 of the air mover chamber. A sump 50 is defined in the bottom of the evaporative section by floor 52 and side walls 54, 55, 56 and 57.

A water supply line 60 is connected to receive water under pressure from a suitable source such as a domestic supply. The water supply line includes a heat exchange section 61 which may consist of a series of coils of tubing such as copper tubing positioned on the top wall 17 of the cooler as seen in FIG. 3. The coils have an inlet which is connected to the water supply line. The heat exchanger 61 is connected by line 60 to the sump as it has been found that elevating the temperature of the water delivered to the evaporative pads provides a beneficial effect as heating speeds the evaporation rate. The level of water in sump 50 is controlled by a float control valve 62 which admits water as required to maintain a predetermined water level.

The cooling media consists of a wettable pad 70 vertically positioned within the cooling chamber within a frame 72 in the air flow path. The cooling media has an area which at least corresponds to the area of inlet 42 to the evaporator section. The wettable pad mounted in the evaporator section may be manufactured from a fibrous cellulosic material such as Excelsior or, as shown, may be a pad of the treated paper type having channels therein. Representative of the treated paper types of pads are pads sold under the designation "Celdek". Water is applied to the upper surface of the wettable pad at a distribution tube 80 having a plurality of nozzles or orifices 82 therein. A circulating pump 85 delivers water from the sump via line 86 to the distribution tube 80 along the top of the pad. The water delivered to the top of the wettable pad by the delivery tube is discharged and under the influence of gravity flows downwardly through the pads and the unevaporated water returns to the sump for recirculation. As the relatively dry, ambient air passes through the wetted pad, the air is cooled by the evaporative effect and the air moving device delivers the cooled air to the discharge 34 which is connected to an appropriate duct or air distribution system.

The foregoing is conventional and representative of a number of evaporative cooler designs as indicated. A scrubber section 14 is shown as a pretreatment stage ahead of the cooling stage and may be associated with evaporative coolers of various designs, the cooler shown being representative. The purpose of the scrubber section is to provide a pretreatment stage in which noxious gases, particulates, dust, pollen, chemical pollutants and the like are at least partially removed or scrubbed from the incoming heated air. Further, the scrubber section also contributes some evaporative cooling effect by evaporative cooling and sensible heat transfer which, when added to the cooling effect which takes place in the evaporator section, improves the overall saturation efficiency of the device. The scrubber section includes a housing having opposite side walls 90 and 92, top wall 94, bottom wall 95 and inlet end wall 96 and outlet end wall 98. The scrubber chamber 105 is defined by duct 100 within the scrubber housing which chamber includes top plate 102, bottom plate 104, each extending transversely between the side walls 90 and 92 of the scrubber section. The top and bottom plates are both pitched or inclined downwardly from the inlet of the duct to the discharge end of the duct with floor 104 terminating at a lip 106 which is located above the sump 50, as seen in FIG. 4. Preferably the duct material is a suitable rust-resistant material such as stainless steel, fiberglass or a plastic such as polypropylene. Louvers or screening 108 are provided at the inlet of the scrubber chamber to prevent leaves, birds, animals or airborne litter from entering into the unit.

The scrubbing of the incoming air is achieved by spray nozzles 110, 112 which are directed to discharge countercurrently to the incoming air flow. As best seen in FIGS. 2 and 3, spray nozzles are each positioned adjacent the discharge end of the scrubber at an intermediate elevation within the scrubber duct and adjacent the opposite side walls. Nozzle 110 is shown adjacent side wall 90 and nozzle 112 is shown in position adjacent side wall 92, each having a generally conical spray pattern. The nozzles may be of the type manufactured by Spray Company Systems of Wheaton, Ill. Full Cone Spray TG03. At 30 psi, the two nozzles deliver approximately 6.24 gallons per hour. The nozzles are adjustable and oriented to direct the spray away from the adjacent side walls so that the conical spray patterns overlap to some extent to provide substantially complete coverage throughout the cross-sectional area of the scrubber duct, as seen in FIG. 2. A spray angle of approximately 60° has been found to work well. The spray pattern and pressure are regulated to provide full coverage directing the spray into the oncoming air without loss of spray at the duct entrance, even at lower blower speeds.

The spray nozzles are each connected to a water supply line 150 which receives water under pressure from the sump 50 from submersible pump 115. Typically, the water pressure is in the range of 20# to 100#. As seen in FIG. 5, a suitable filter 120, pressure regulator 122, and electrically operated solenoid valve are interposed between the pump and the spray nozzles 110, 112. The filter is provided to remove particulate matter such as sand or rust which could plug the spray nozzles. The pressure regular 122 maintains a predetermined water pressure to maintain the desired water delivery rate. The solenoid valve is connected to the electrical circuit of the evaporative cooler allowing water to be discharged from the nozzles when the blower is running. In addition, spray nozzles of the type described above are also provided with internal filters as secondary protection against plugging. Alternatively, the nozzles may be directly connected to any convenient water source such as a domestic supply which has adequate line pressure on the discharge side of the water heating unit. The supply will be filtered and regulated as shown in FIG. 5 and controlled by solenoid valve to operate only when the blower motor 32 is energized. It is preferred however, that the water supply be drawn from the sump which contains the water which has been heated by solar radiation as described above.

The spray nozzles each deliver a fine mist in the direction indicated on the drawings which is in a direction countercurrent to the air movement through the scrubber. In this manner, some evaporation and thus cooling of the incoming air will occur within the scrubber section. More importantly, the spray nozzles emit a fine mist of water droplets which serve to entrap gases and some particulate material. The water spray will impinge on the internal walls of duct 100 and flow to the bottom plate of the scrubber to be carried under the influence of gravity to the main sump 50. As seen in FIG. 4, plate 104 of the scrubber is provided with a small down turned lip 106 which will serve to direct the water returning from the scrubber to the sump 50 of the evaporator section. The sump is generally provided with a stand pipe or overflow which will bleed-off excess water and which will serve to prevent excess mineral concentrations from occurring within the sump.

Another important feature of the invention is that the spray and the scrubber will wet the surface of the evaporative media pad to prevent build-up of mineral deposits on the face of the pad. This enhances pad performance and increases pad life which is particularly important in the case of the more expensive Celdek-type cooler pads.

In addition, a filter such as a fiberglass mat 130 may be placed at the face of the evaporative media. The mat collects water, mist and dirt and solids. The mat also prevents mineral build up on the surface of the evaporative pad. It is critical in a spray evaporation system to prevent dirt, dust and evaporative residue (which can be harmful to the lungs) from entering into the temperature controlled area.

As described, the scrubber has been shown in connection with a single inlet cooler of the type having a Celdek pad. However, the scrubber can be adapted to the conventional three and four-sided evaporative coolers. In such a case, the scrubber would include a shroud which encloses the evaporative unit.

The present invention further includes means for preheating the air entering the intermediate scrubber section. The air entering the scrubber section is heated to a temperature above ambient and, as indicated above, the temperature of the water in the sump of the cooler may also be elevated. As has been pointed out above, conventional evaporative cooler machines are generally considered to be only 60% to 80% efficient in reaching saturation temperature.

To improve the saturation efficiency, the unit of the present invention is provided with an intake duct 200 ahead of the air intake opening of the scrubber. The duct 200 consists of a pair of generally triangular side panels 202 extending at right angles and arranged adjacent the opposite side of the scrubber inlet. A cover panel 210 extends between the idle panels having its upper edge engaging the top 94 of the scrubber. Accordingly, an inlet 225 is defined at the lower end of the duct to allow air to enter the duct and pass into the scrubber section. The panels 202 may be attached to the housing by screws or may be detachably secured by wing nuts, turn lock fasteners or any other conventional means. The inlet duct may also be formed as an integral part of the scrubber. The panels 202 and 210 are preferably fabricated from suitable heat absorbent material such as sheet metal or suitably plastic coated with an absorptive coating such as flat black paint. Thus, the air entering the scrubber at inlet wall 96 will be heated enthalpically by solar radiation prior to entering the scrubber. The intake duct 200 also serves to minimize the effects of wind by bringing the air intake closer to the warm mounting surface such as a roof, and also serves to prevent temperature dilution once the heating effect is achieved. Panel 210 may be reinforced by intersecting creases as seen in FIG. 6.

Additional enthalpic heating is obtained by placing an absorber material 230 adjacent and surrounding or at least partially surrounding the cooler unit on the mounting surface 228 which would normally be the roof. Accordingly, the absorbent material is shown as a sheet of material having heat absorbing characteristics and again may be metal coated with a suitable absorptive coating or may be material such as black roofing material or black vinyl film. Typically, absorber pad 230 will extend at least several feet outwardly from the unit in the area surrounding the duct inlet 200 as shown in FIG. 3. Because of the configuration of the duct 200, air entering the scrubber necessarily has to pass in close proximity to the surface of the pad 230 which will cause heating of the incoming air above free air ambient temperature due to the effects of the solar radiation. The present system is a passive system and enthalpic heating of the incoming air is achieved without the expenditure of any additional energy costs which results in increased saturation efficiency and a colder output air temperature at the discharge from the evaporative cooler section of the unit. A translucent or transparent air intake tunnel may be placed at the inlet duct to further facilitate heating of the incoming air. Further reference is made to U.S. Pat. No. 4,658,600 for a discussion relative to the improvement achieved by enthalpic heating of air in an evaporative cooler.

It will be obvious to those skilled in the art to make various changes, modifications and alterations to the invention described herein. To the extent that these various changes, modifications and alterations do not depart from the scope of the appended claims, they are intended to be encompassed therein.

I claim:

1. An evaporative cooling device comprising:

(a) an evaporative cooling section having a cabinet with an intake for air to be cooled and a discharge for cooled air;

(b) air delivery means having air moving means for inducing an air flow from said intake to the discharge;

(c) evaporative cooling media located at said intake;

(d) a sump for providing a water supply;

(e) means for delivering water from said sump to said evaporative cooling media;

(f) a scrubber section adjacent said evaporative cooler section and in communication with the intake for air to be cooled, said scrubber section including a housing having an inlet and at least one spray nozzle communicating with said sump oriented to spray finely divided water mist into the incoming air stream flowing to said evaporative cooler intake; and (g) heating means for elevating the temperature of air entering said scrubber section inlet to a temperature above the free ambient air temperature.

2. The cooling device of claim 1 wherein said heating means comprises a duct means at said scrubber inlet proximally spaced from a thermally absorptive material whereby the air entering said scrubber is heated above the temperature of the ambient air.

3. The cooling device of claim 2 wherein said duct is coated with a heat absorptive material.

4. The cooling device of claim 1 further including heat exchanger means positioned to heat the said water supply in said sump.

5. The cooling device of claim 4 wherein said heat exchanger comprises coils positioned on said unit to receive solar energy.

6. The cooling device of claim 1 wherein said evaporative cooling section and said scrubber section utilize a common sump and wherein water collecting in said scrubber is directed to said sump.

7. The cooling device of claim 1 wherein said spray nozzle is connected to a filter, pressure regulator and valve.

8. The cooling device of claim 2 further including a screen at the duct.

9. The cooling device of claim 2 wherein said cooling section and scrubber are arranged in line.

\* \* \* \* \*